United States Patent [19]

Engle

[11] Patent Number: 5,286,232
[45] Date of Patent: Feb. 15, 1994

[54] SLIP YOKE ASSEMBLY FOR OUTPUT OF POWER TRANSMISSION DEVICE

[75] Inventor: Jack F. Engle, Muncie, Ind.

[73] Assignee: Borg-Warner Automotive Diversified Transmission Products Corporation, Sterling Heights, Mich.

[21] Appl. No.: 866,680

[22] Filed: Apr. 10, 1992

[51] Int. Cl.⁵ .................... B60K 25/02; F16D 1/06
[52] U.S. Cl. .................... 464/162; 464/154; 384/482
[58] Field of Search .............. 464/7, 16, 133, 154, 464/162, 178; 384/477, 482, 498; 74/606 R, 606 A

[56] References Cited

U.S. PATENT DOCUMENTS

| | | | |
|---|---|---|---|
| 2,749,191 | 6/1956 | Cole et al. | 464/154 X |
| 3,377,074 | 4/1968 | Cundy | 384/482 X |
| 4,103,753 | 8/1978 | Holdeman | |
| 4,475,737 | 10/1984 | Cook, Jr. et al. | 464/162 X |
| 4,693,699 | 9/1987 | Gregerson | 464/133 |
| 4,861,172 | 8/1989 | Annast et al. | 464/162 X |
| 4,991,992 | 2/1991 | Gutfleisch | 464/162 X |
| 5,046,994 | 9/1991 | Hasegawa et al. | 475/83 |

FOREIGN PATENT DOCUMENTS

| | | | |
|---|---|---|---|
| 0440518 | 8/1991 | European Pat. Off. | 464/162 |
| 526560 | 9/1940 | United Kingdom. | |

Primary Examiner—Clifford D. Crowder
Assistant Examiner—John J. Calvert
Attorney, Agent, or Firm—Willian Brinks Olds et al.

[57] ABSTRACT

An annular propeller shaft (10) for transmitting torque from an automotive vehicle transfer case to the rear axle of the vehicle, the propeller shaft having an internal spline (16) which receives an externally splined portion (18a) of a drive shaft (18) at its torque input end and which is adapted to receive an externally splined portion of a slip yoke of a universal joint at its torque output end. The torque input end and a major portion of the length of the propeller shaft are surrounded by an internally lubricated housing (12), and the drive shaft is rotatingly support with respect to the housing by a ball bearing (20). The propeller shaft is rotatingly sealed with respect to the housing by a seal (32) and is rotatingly supported with respect to the housing by a sealed for life, internally lubricated ball bearing (28) which is positioned outboard of the seal. The outboard ball bearing is protected from contamination from external debris by an annular sheet metal guard housing.

12 Claims, 1 Drawing Sheet

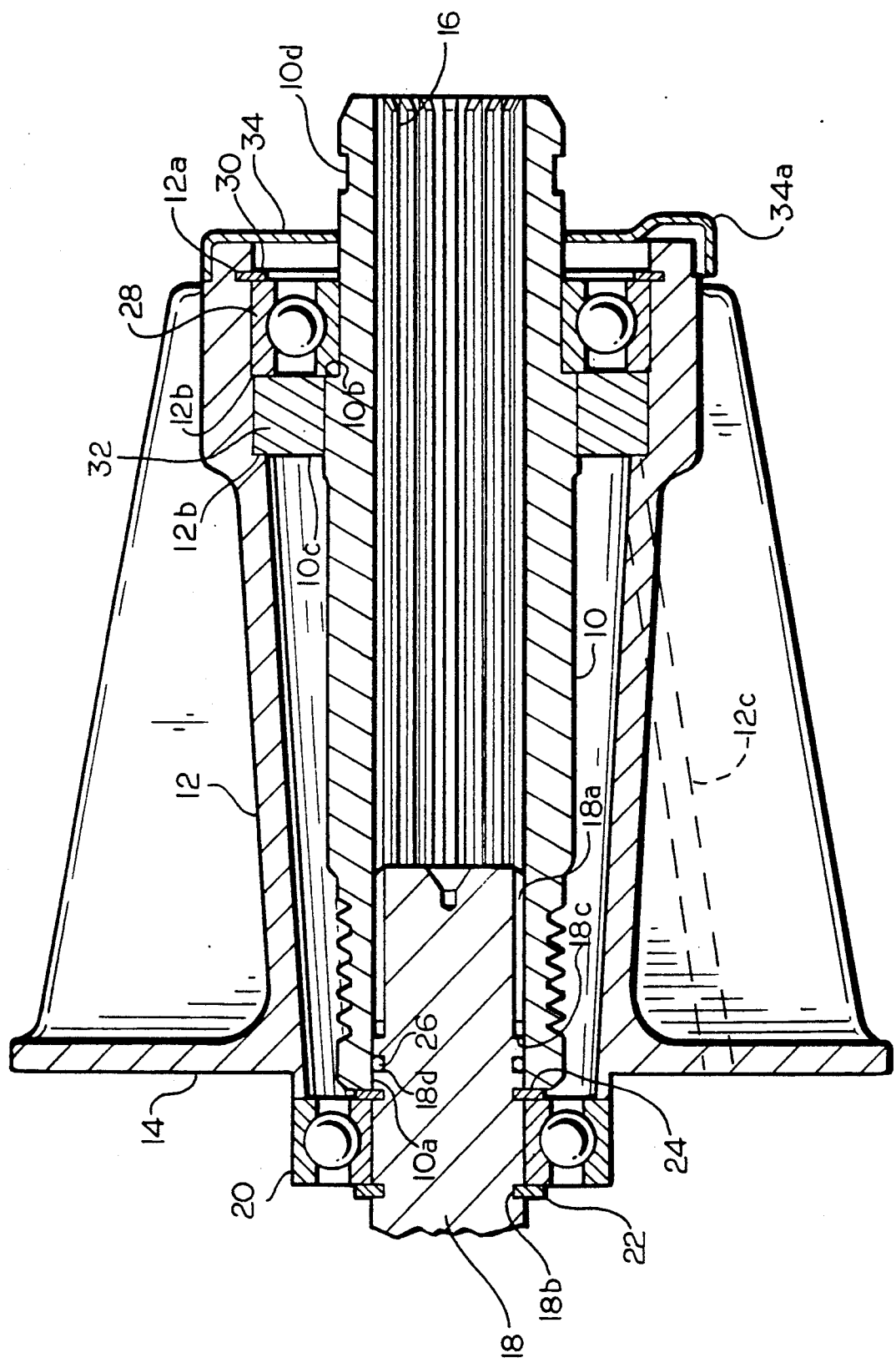

SLIP YOKE ASSEMBLY FOR OUTPUT OF POWER TRANSMISSION DEVICE

FIELD OF THE INVENTION

This invention relates to an output shaft and housing for an automotive transfer case or other mechanical power transfer device.

BACKGROUND OF THE INVENTION

U.S. Pat. No. 4,103,753 (J. W. Holdeman) describes a power transfer device of a type which is suited for use as a torque transfer case in an automotive vehicle, where such a device serves to transmit torque from an engine or prime mover to a plurality of drive axles to thereby drive front and rear pairs of vehicle wheels. A transfer case according to the aforesaid patent and other known automotive transfer cases each utilize a rearwardly extending output or propeller shaft for transmitting torque to the rear wheels of the vehicle.

A typical output or propeller shaft of an automotive transfer case must be capable of accommodating limited axial slip along its longitudinal axis of rotation relative to a coaxial input shaft which transmits torque thereto and/or with respect to a member to which it transmits torque, to accommodate changes in distance that can occur between the transfer case and the rear axle that is driven by the propeller shaft. Such changes can occur as a result of the normal movement of the suspended wheels of the vehicle relative to the body as the vehicle travels over a highway or over unpaved terrain. Thus, such a propeller shaft is normally constructed with an internal spline which receives an end of an output drive shaft from the transfer case and/or with an internal spline which receives an end of a universal joint yoke or other member which is driven by the propeller shaft. In such a splined propeller shaft arrangement, the propeller shaft is encased within an annular housing with a flanged open end which is sealingly secured to the transfer case housing. The housing surrounds the propeller shaft and the end portion of any drive shaft which is received therein in a splined connection, to a location beyond the splined connection between the drive shaft and the propeller shaft. The drive shaft and propeller shaft are each normally rotatingly received in a bushing or rotating bearing, usually an inner bushing at or near the juncture between the transfer case and the housing in the case of the drive shaft and an outer bushing near the outlet of the transfer case in the case of the propeller shaft. In such an arrangement the propeller shaft housing is in fluid communication with the transfer case to permit lubricant from the transfer case to properly lubricate the bushings and other moving parts within the housing.

In a transfer case arrangement as described above, the propeller shaft extends beyond the closed end of the propeller shaft housing to connect with a yoke or other input connection to a universal joint at the differential which serves to drive the rear axle of the vehicle. Where the propeller shaft housing receives lubricant from the transfer case, a suitable seal must be provided between the propeller shaft and the surrounding structure of the opening in the housing through which the propeller shaft extends to prevent lubricant from within the housing from leaking through such opening. Rotating seals which are suitable for such an application are complex and expensive and heretofore it was required that such seals also be able to accommodate axial slip, a factor which further adds to the required complexity of the seal and subjects it to additional life shortening wear. Further, an exposed portion of an oscillating and rotating member can become laden with debris of an abrasive nature, and when such portion moves to a location within a seal, its subsequent rotation can be damaging and life-shortening to the seal.

SUMMARY OF THE INVENTION

According to the present invention there is provided an output or propeller shaft and an internally lubricated housing for an automotive transfer case or other mechanical torque transfer device. The housing is capable of sealingly accommodating rotational movement of the propeller shaft relative to the housing without being required to accommodate axial movement of the propeller shaft relative to the housing at the location of the seal therebetween. The propeller shaft of the present invention is in the form of an internally splined annular shaft which extends beyond the outer, generally closed end of the housing. An innermost end portion of the annular shaft receives an externally splined drive shaft which transmits torque thereto from the transfer case, the splined connection between the drive shaft and the propeller shaft permitting limited axial slip but no material circumferential movement therebetween. An outermost end portion of the propeller shaft, in turn, is adapted to receive an externally splined end of a yoke or other driven member which serves to transmit torque from the transfer case to a differential at the rear axle of the associated vehicle, specifically, to a universal joint which is used in conjunction with a differential. The splined connection between the yoke and the propeller shaft, which is sometimes referred to as a slip yoke, permits limited axial slip but no material circumferential movement therebetween.

With the use of a slip yoke to transmit torque from the transfer case propeller shaft to the differential or other driven member, the associated vehicle, especially in conjunction with a splined connection between the propeller shaft and the drive member, eliminates the axial oscillating movement that the propeller shaft would otherwise experience during the normal operation of the vehicle, such axial oscillating movement now being accommodated by the plunging or axial motion of the splined yoke relative to the propeller shaft. This feature eliminates the need to provide an oscillating oil seal to seal the opening between the housing on the outside of the propeller shaft, and thereby permits such opening to be properly sealed by a less complex, conventional oil seal that need only be able to accommodate relative rotational movement between the housing and the propeller shaft. Further, according to the present invention, the continuously lubricated outboard bushing or sliding bearing of a conventional, prior art transfer case propeller shaft housing, which heretofore was positioned inboard of the oil seal to permit such bushing or sliding bearing to be properly lubricated, can be and preferably is replaced by an internally sealed for life and self-lubricated roller or ball bearing to provide the necessary rotational support for the propeller shaft outer member relative to the housing. This eliminates the need for continuous exposure of the outboard bearing to lubrication from within the transfer case and housing, and thereby permits the outboard bearing to be placed outboard of the oil seal and serves to eliminate or at least further reduce lubricant leaks from a transfer case propeller shaft/slip yoke connection and to do so effectively for the useful life of the associated vehicle, or at least for a very long period of time.

Accordingly, it is an object of the present invention to provide a transfer case or other mechanical power transfer device with an improved slip yoke power output or propeller shaft. More particularly, it is an object of the present invention to provide a transfer case of the foregoing character whose power output or propeller shaft can be sealed more easily and more effectively against lubricant leaks through an opening in the propeller shaft housing through which the propeller shaft extends.

For a further understanding of the present invention and the objects thereof, attention is directed to the drawing and the following brief description thereof, to the detailed description of the preferred embodiment and to the appended claims.

IN THE DRAWING

The only FIGURE in the drawing is an elevational view, in cross section, of a transfer case propeller or output shaft, with an associated housing and other structure relating thereto, in accordance with the preferred embodiment of the present invention.

DETAILED DESCRIPTION OF THE PREFERRED EMBODIMENT

A propeller shaft for an automotive transfer case, or other mechanical power transfer device, according to a preferred embodiment of the present invention is identified by reference numeral 10 in the drawing and is annular in configuration. A major portion of the propeller shaft 10 is surrounded by a housing 12 with an annular flange 14 at a torque input end of the housing 12. The flange 14 is adapted to be sealingly secured to other portions of the transfer case (not shown). The propeller shaft 10 is provided with an internal spline 16 which extends from a location near the torque input end thereof to the torque output end thereof. The torque input end of the propeller shaft 10 receives an externally splined end portion 18a of a drive shaft 18, shown fragmentarily, from the transfer case to permit torque from the transfer case to be imparted to the propeller shaft 10.

The splined connection between the drive shaft 18 and the propeller shaft 10 permits limited relative axial movement between the drive shaft 18 and the propeller shaft 10, to help to accommodate normal changes in spacing between an automotive transfer case and its rear axle as the vehicle moves down a highway or across unpaved terrain. However, the splined connection between the drive shaft 18 and the propeller shaft 10 does prevent relative circumferential movement therebetween, other than the backlash which is required for proper clearance between splined parts.

The drive shaft 18 is rotatingly supported relative to the housing 12 by a ball bearing 20 which is secured to the housing 12 or to the housing of the associated transfer case. The ball bearing 20 is axially trapped relative to the drive shaft 18 by bearing retainers 22, 24, which are received in annular notches 18b, 18c, respectively, in the drive shaft 18. Lubricant from the transfer case is prevented from flowing into the splined connection between the propeller shaft 10 and the drive shaft 18 by an O-ring seal 26, which is retained in an annular notch 18d in the drive shaft 18 and which engages an unsplined portion 10a of the propeller shaft 10 at the torque input end thereof in an endless pattern.

The propeller shaft 10 is rotatingly supported relative to the housing 12 near a torque output end of the propeller shaft 10 by a ball bearing 28, or other bearing which does not rely on sliding friction between it and the member that rotates therein. The bearing 28, preferably, is of a sealed for life, self-lubricating type, and is axially trapped relative to the propeller shaft 10 by a radially extending shoulder 10b and by a bearing retainer 30 which is received in an inwardly facing annular recess 12a of the housing 12. The bearing 28 is also axially fixed relative to the housing 12 by the bearing retainer 30 and by a radially extending shoulder 12b of the housing 12.

The housing 12 is open to the flow of lubricant thereinto from the associated transfer case, and an inclined lubricant return passage 12c is provided in the housing 12 for gravity return of lubricant from the housing 12 to the transfer case. Because of the presence of lubricant within the housing 12, it is necessary to provide a suitable seal around the propeller shaft 10 to prevent lubricant from leaking from the housing 12 along the propeller shaft 10. To that end, a seal 32 is provided to sealingly surround a cylindrical surface portion 10c of the propeller shaft 10. When the bearing 28 is a sealed for life, self-lubricating bearing, as described, it need not be lubricated by lubricant from within the housing 12, and the seal 32, thus, is positioned inboard of the bearing 28 where it will be capable of performing its sealing function in a most effective manner.

The spline 16 of the propeller shaft 10 extends to the torque output end thereof, that is, to the end thereof that extends beyond the housing 12. The propeller shaft 10, thus, is adapted to transmit torque to a slip yoke of the universal joint, not shown, whose torque input end is externally splined to be drivingly received within the free end of the propeller shaft 10. Consequently, any required relative axial movement downstream of the spline connection between the propeller shaft 10 and the drive shaft 18 can be accommodated by the splined connection between the propeller shaft 10 and the slip yoke to which it transmits torque, and the oil seal 32, thus, need not be capable of accommodating relative axial movement between itself and the propeller shaft 10. While positioning the bearing 28 outboard of the oil seal 32 is the preferred mode of practicing the present invention, it is also contemplated that the oil seal 32 could be the outboard member in which the bearing 28 could be replaced by a conventional bearing or bushing To prevent moisture, dust and other debris from contaminating the bearing 28, an annular stamped sheet metal retainer or guard 34 is affixed to the outboard free end of the housing 12. The retainer 34 is provided with an enlarged portion 34a at its lowermost reach to permit moisture that enters the retainer 34 to drain therefrom by gravity. It is also to be noted that the end of the propeller shaft 10 which extends beyond the housing 12 is provided with an annular groove 10d to receive an end of a flexible, elastomeric boot, not shown, another end of which is to be affixed to the yoke whose end is received in the propeller shaft 10. Such a boot will prevent moisture, dust and other debris from entering the open, torque transmitting end of the propeller shaft 10.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. Apparatus for transmitting torque from a driving member having an externally splined torque output end and roller contact bearing means rotatingly supporting the driving member, said apparatus further comprising:

a rotatable propeller shaft having a torque input end and a torque output end, said torque input end of said propeller shaft having an open portion extending from the torque input end of said propeller shaft at least partly to the torque output end of said propeller shaft, said open portion of said torque input end of said propeller shaft having an internally splined portion which drivingly receives the externally splined torque output end of said driving member, said propeller shaft further having an open portion extending from the torque output end of said propeller shaft at least partly to the torque input end of said propeller shaft, said open portion of said torque output end of said propeller shaft having an internally splined portion which is adapted to drivingly receive a portion of a member that is to be driven by said propeller shaft;

a housing surrounding a substantial portion of the torque input portion of said propeller shaft including the internally splined portion which receives the externally splined torque output end of the driving member, said torque output portion of said propeller shaft extending beyond said housing, said housing being adapted to receive lubricant therein;

sealing means within said housing, said sealing means sealingly engaging said propeller shaft at a location spaced from said torque output end thereof and being adapted to sealingly accommodate rotation of said propeller shaft relative to said housing; and sealed, internally lubricated rolling contact bearing means rotatingly supporting said propeller shaft with respect to said housing, said sealed, internally lubricated rolling contact bearing means being positioned outboard of said sealing means and being isolated by said sealing means from contact with lubricant within said housing.

2. Apparatus according to claim 1 wherein said propeller shaft is annular in configuration and has a splined interior extending from the torque output end of said propeller shaft substantially to the torque input end of said propeller shaft.

3. Apparatus according to claim 2 wherein said torque input end of said propeller shaft further has an unsplined portion, and wherein said output end of said driving member has an outwardly facing O-ring receiving recess at a location inwardly from the externally splined torque output end of the driving member, and further comprising;

an O-ring in said O-ring receiving recess of said driving member, said O-ring engaging said unsplined portion of said torque input end of said propeller shaft.

4. Apparatus according to claim 1 wherein said sealing means is incapable of accommodating substantial movement of said propeller shaft along its longitudinal axis of rotation.

5. Apparatus according to claim 1 and further comprising:

an annular guard affixed to an end of the housing through which said torque output portion of said propeller shaft extends, said annular guard serving to protect said sealed, internally lubricated bearing means from being contaminated by debris and other external substances.

6. Apparatus according to claim 5 wherein said annular guard has a moisture receiving lowermost reach by which moisture may be drained from the interior said annular guard.

7. In a transfer case for an automotive vehicle, apparatus for transmitting torque along an axis whose length is subject to change during the operation of the vehicle from a driving member having an externally splined torque output end and rolling contact bearing means rotatingly supporting the driving member, said apparatus further comprising:

a rotatable propeller shaft having a torque input end and a torque output end, said torque input end of said propeller shaft having an open portion extending from the torque input end of said propeller shaft at least partly to the torque output end of said propeller shaft, said open portion of said torque input end of said propeller shaft having an internally splined portion which drivingly receives the externally splined torque output end of said driving member, said propeller shaft further having an open portion extending from the torque output end of said propeller shaft at least partly to the torque input end of said propeller shaft, said open portion of said torque output end of said propeller shaft having an internally splined portion which is adapted to drivingly receive a portion of a member that is to be driven by said propeller shaft and to accommodate movement of the member to be driven relative to said propeller shaft along the axis of rotation of said propeller shaft;

a housing surrounding a substantial portion of the torque input portion of said propeller shaft including the internally splined portion which receives the externally splined torque output end of the driving member, said torque output portion of said propeller shaft extending beyond said housing, said housing being adapted to receive lubricant therein;

sealing means within said housing, said sealing means sealingly engaging said propeller shaft at a location spaced from said torque output end thereof and being adapted to sealingly accommodate rotation of said propeller shaft relative to said housing; and sealed, internally lubricated ball bearing means rotatingly supporting said propeller shaft with respect to said housing, said sealed, internally lubricated rolling contact bearing means being positioned outboard of said sealing means and being isolated by said sealing means from contact with lubricant within said housing.

8. Apparatus according to claim 7 wherein said propeller shaft is annular in configuration and has a splined interior extending from the torque output end of said propeller shaft substantially to the torque input end of said propeller shaft.

9. Apparatus according to claim 8 wherein said torque input end of said propeller shaft further has an unsplined portion, and wherein said output end of said driving member has an outwardly facing O-ring receiving recess at a location inwardly from the externally splined torque output end of the driving member, and further comprising;

an O-ring in said O-ring receiving recess of said driving member, said O-ring engaging said unsplined portion of said torque input end of said propeller shaft.

10. Apparatus according to claim 7 wherein said sealing means is incapable of accommodating substantial movement of said propeller shaft along its longitudinal axis of rotation.

11. Apparatus according to claim 7 and further comprising:
an annular guard affixed to an end of the housing through which said torque output portion of said propeller shaft extends, said annular guard serving to protect said sealed, internally lubricated ball bearing means from being contaminated by debris and other external substances.

12. Apparatus according to claim 11 wherein said annular guard has a moisture receiving lowermost reach by which moisture may be drained from the interior said annular guard.

* * * * *